United States Patent
Tsypliaev et al.

(10) Patent No.: US 10,437,804 B1
(45) Date of Patent: Oct. 8, 2019

(54) STORING GRAPH DATA REPRESENTING WORKFLOW MANAGEMENT

(71) Applicant: Comindware Ltd., Tortola (VG)

(72) Inventors: Maxim V. Tsypliaev, Moscow (RU); Peter A. Volynskiy, Moscow (RU)

(73) Assignee: Comindware Ltd., Tortola (VG)

( * ) Notice: Subject to any disclaimer, the term of this patent is extended or adjusted under 35 U.S.C. 154(b) by 704 days.

(21) Appl. No.: 14/943,088

(22) Filed: Nov. 17, 2015

Related U.S. Application Data

(63) Continuation of application No. 13/624,078, filed on Sep. 21, 2012, now Pat. No. 9,189,509.

(51) Int. Cl.
 *G06F 17/30* (2006.01)
 *G06F 16/22* (2019.01)
 *G06F 16/901* (2019.01)

(52) U.S. Cl.
 CPC ...... *G06F 16/2246* (2019.01); *G06F 16/2255* (2019.01); *G06F 16/9024* (2019.01)

(58) Field of Classification Search
 None
 See application file for complete search history.

(56) References Cited

U.S. PATENT DOCUMENTS

| | | | | |
|---|---|---|---|---|
| 6,285,996 B1* | 9/2001 | Jou | ............ | G06F 17/30312 |
| 8,086,641 B1* | 12/2011 | Carr | ............ | G06F 17/30327 |
| | | | | 707/706 |
| 2001/0021914 A1* | 9/2001 | Jacobi | ............ | G06Q 30/02 |
| | | | | 705/14.53 |
| 2005/0228805 A1* | 10/2005 | Britton | ............ | G06Q 30/02 |
| 2006/0235823 A1* | 10/2006 | Chong | ............ | G06F 17/30557 |
| 2008/0065448 A1* | 3/2008 | Hull | ............ | G06Q 10/04 |
| | | | | 705/7.26 |
| 2008/0288595 A1* | 11/2008 | Liu | ............ | G06Q 10/10 |
| | | | | 709/206 |
| 2009/0240737 A1* | 9/2009 | Hardisty | ............ | G06F 17/30067 |
| 2012/0041794 A1* | 2/2012 | Lemcke | ............ | G06Q 10/06 |
| | | | | 705/7.11 |
| 2012/0221828 A1* | 8/2012 | Fang | ............ | G06F 3/0608 |
| | | | | 711/206 |

(Continued)

OTHER PUBLICATIONS

W3.org. (2010). A Direct Mapping of Relational Data to RDF. [online] Available at: https://www.w3.org/2001/sw/rdb2rdf/directGraph/ [Accessed Jan. 30, 2019]. (Year: 2010).*

*Primary Examiner* — Aleksandr Kerzhner
*Assistant Examiner* — Eddy Cheung
(74) *Attorney, Agent, or Firm* — Bardmesser Law Group

(57) ABSTRACT

A method and system for storing complex graph data. The graph data is represented by triples, quadruples, quintuples, etc. In order to speed up storage and retrieval of graph data, the data is stored in a form of triples, quadruples, quintuples, etc. in a B-tree. The B-trees are data structures that allow operations on dynamic data sets. The operations can be search, search for minimum and maximum values, insert, delete, reference to parent or child directory. The tree can be used as a dictionary or as a prioritized chain. The speed of tree operations is proportional to the height. The data is read as blocks from the same location. If a tree node is moved to an operational memory, an allocated memory block is moved and the operation executes very fast.

18 Claims, 8 Drawing Sheets

(56) References Cited

U.S. PATENT DOCUMENTS

| | | | |
|---|---|---|---|
| 2012/0290595 A1* | 11/2012 | Kreindler | G06F 17/30374 707/756 |
| 2013/0080473 A1* | 3/2013 | Kuno | G06F 16/278 707/797 |
| 2013/0262443 A1* | 10/2013 | Leida | G06F 17/30448 707/722 |
| 2013/0346339 A1* | 12/2013 | Yao | G06Q 10/06 705/348 |

* cited by examiner

STORING GRAPH DATA REPRESENTING WORKFLOW MANAGEMENT

BACKGROUND OF THE INVENTION

Field of the Invention

The present invention is related to methods for data storage, and more particularly, to storing graph data.

Description of the Related Art

Data is typically stored in databases. The most common databases are relational databases. A relational database is a set of tables consisting of columns and rows. All tables are connected (i.e., related) to each other via a primary key. The data is retrieved from the database by, for example, SQL queries that return data from one or several tables.

One SQL query can retrieve data from several tables by using JOIN SQL operator that connects table using the primary key. A relational database system is very complex. For example, a simple SELECT statement for selecting the data can be executed in a variety of ways. The relational database engine finds an optimal way of selecting and retrieving data. The database engine applies optimization algorithms in order to return data in a fastest way possible.

However, in cases of hundreds of thousands or even millions of records, data retrieval can be quite slow. The data can be stored and retrieved faster, if the data is stored in a form of triples, quadruples, quintuples, n-tuples or combinations of an arbitrary number of elements. Conventional relational databases also can operate with triples or quadruples-type data, however, there are a number of disadvantages of this approach, such as data redundancy, which in turn leads to anomalies and data inconsistencies. Processing and searching through triples in conventional databases is also a computationally intensive process, which leads to slowdowns when working with relational databases.

Accordingly, there is a need in the art for a system and method for efficient storage and retrieval of complex graph data formed into triples, quadruples, quintuples, etc.

SUMMARY OF THE INVENTION

The present invention is related to storage of graph data in a B-tree that substantially obviates one or several disadvantages of the related art.

A method and system for storing complex graph data is provided. The graph data can represent a workflow of a process, for example, business process. The process can be controlled by a state machine. Then, the workflow data can be represented by a triple consisting of stages of the process (i.e., states of the state machine), a task and an assignee of the task. These triples are stored in the B-tree.

In order to speed up storage and retrieval of data, the data is stored in a form of triples, quadruples, quintuples, etc. in a B-tree. The B-trees are data structures that allow operations on dynamic data sets. The operations can be search, search for minimum and maximum values, insert, delete, reference to parent or child directory. The tree can be used as a dictionary or as a prioritized chain. The speed of tree operations is proportional to the height. The data is read as blocks from the same location. If a tree node is moved to an operational memory, an allocated memory block is moved and the operation executes very fast.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
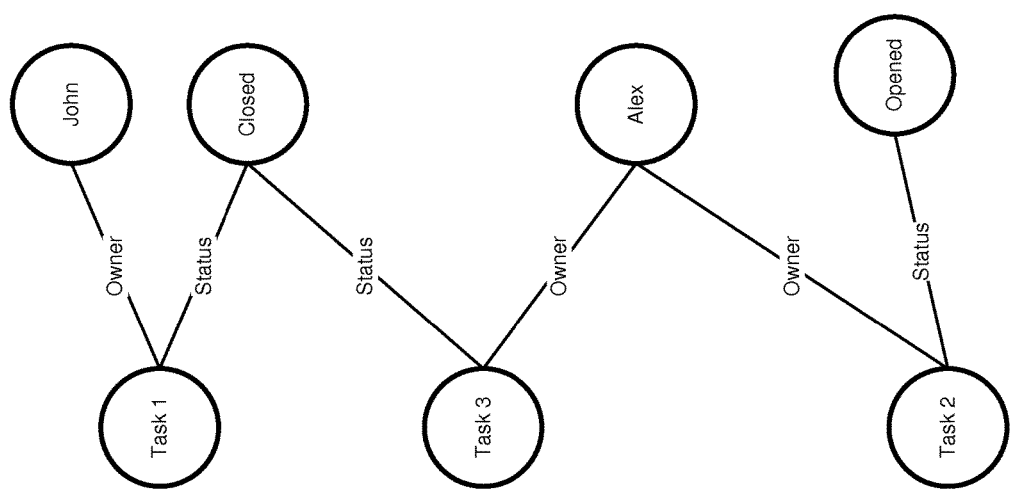
FIG. 1 illustrates a graph, in accordance with the exemplary embodiment.

Reference will now be made in detail to the preferred embodiments of the present invention, examples of which are illustrated in the accompanying drawings.

A method and a system for storing complex graph data are provided. Graph data can represent a workflow of a process, such as business process. The process can be controlled by a state machine. Then, the workflow data can be represented by a triples (or, more generally, n-tuple) representing stages/states of the process (i.e., states of the state machine), a task and an assignee of the task, relations between states of the process, and other data of the process, and data associated with the process, an application used to handle the process, to connect the process with other processes/In other words, all data can be written/stored in triples, for example all data related to any process can be stored in triples. The conditions of relationships between the state machine's states can bw stores as triples. These triples are stored in the at least one key-value and/or key store represented as at least one B-tree. In the particular case each store (a key-value store or a key store) can be represented as a single B-tree, or some B-trees. In other case, some stores (key stores, key-values stores) can be represented as a single B-tree. A workflow represent a process that can have at least one or more states, multiple tasks and assignees for each task and state of the process. All internal and external processes of the process also can be represented as statemetts. The data can be represented, for example, by triples, quadruples, quintuples, n-tuples, as well.

According to an exemplary embodiment, in order to speed up storage and retrieval of workflow data, the data is stored in a form of triples, quadruples, quintuples, etc. in a B-tree. The trees are data structures that allow operations on dynamic data sets. The operations can be search, search for minimum and maximum values, insert, delete, reference to parent or child directory. The tree can be used as a dictionary or as a prioritized chain.

The speed of tree operations is proportional to the height. Balanced trees have minimized height. For example, a height of a binary tree with n nodes equals log n. B-trees are balanced trees and the speed of operations within the B-trees is proportional to their height. The B-trees work effectively with a disk memory, because they minimize I/O calls. The data is read as blocks from the same location.

If a tree node is moved to an operational memory, an allocated memory block is moved and the operation executes very fast. Thus, the server load is small and the waiting time is minimal. Therefore, a use of a B-tree is advantageous for storing complex data.

According to the exemplary embodiment, triples are stored in a triplestore. The triplestore is a special database for storage and retrieval of the triples. The triple is a data entity composed of subject-predicate-object (argument-predicate-argument, argument-connector-argument), like "John is 35" or "John knows Helen". A predicate is a one type of the connector. Much like a relational database, the information is stored in the triplestore and retrieved by a query statement. Unlike a relational database, the triplestore is optimized for the storage and retrieval of the triples. In addition to queries, the triples can be imported/exported using Resource Description Framework (RDF) and other formats. Note the triple can be considered as a special case of n-tuple with two arguments. In the most common case, graph(s) can be represented as n-tuples. Also note, the graph is: an undirected graph, a directed graph, a mixed graph, a multigraph, a simple graph, a quiver, a weighted graph, a half-edged graph, a regular graph, a complete graph, a bipartite graph, a linear graph, a planar graph, a cycle graph, tree, etc.

The triplestores can store billions of triples. The triplestores can be built as proprietary database engines or they can be built on top of the existing commercial relational database engines (i.e., SQL-based database engines). Online analytical processing (OLAP) databases used triplestores integrated into existing database engines. However, proprietary (native) triplestore have performance advantages.

A difficulty with implementing triplestores over SQL is that implementing efficient querying of a graph-based RDF model (i.e., mapping from SPARQL (an RDF query language, that is, a query language for databases, designed to retrieve and manipulate data stored in Resource Description Framework format.) onto SQL queries) is difficult. The Semantic Web takes the solution further. It involves publishing in languages specifically designed for data: Resource Description Framework (RDF), Web Ontology Language (OWL), and Extensible Markup Language (XML). The HTML describes documents and the links between them. The RDF, the OWL, and the XML, by contrast, can describe arbitrary things such as people, meetings, car parts, etc.

Ontologies are considered to be the pillars of the semantic network, although they do not have a universally accepted definition. A (semantic network) vocabulary can be considered as a special form of (usually light-weight) ontology, or sometimes merely as a collection of URIs with a (usually informally) described meaning.

Ontologies are usually assumed to be accompanied by some document in a formal ontology language, though some ontologies do not use standardized formats for that purpose. In computer science and artificial intelligence, ontology languages are formal languages used to construct ontologies. They allow the encoding of knowledge about specific domains and often include reasoning rules that support the processing of that knowledge. These rules also can be stored as triples (or, more generally, n-tuples). The ontology languages are usually declarative languages, are almost always generalizations of frame languages, and are commonly based either on a first-order logic or on description logic.

These technologies are combined in order to provide descriptions that supplement or replace the content of Web documents. Thus, content can manifest itself as descriptive data stored in Web-accessible databases, or as a markup within documents, particularly, in Extensible HTML (XHTML) interspersed with XML, or, more often, purely in XML, with layout or rendering cues stored separately. The machine-readable descriptions enable content managers to add meaning to the content, i.e., to describe the structure of the available knowledge about that content. In this way, a machine can process knowledge itself, instead of a text, using processes similar to a human deductive reasoning and inference, thereby obtaining more meaningful results and helping computers to perform automated information gathering and research.

The Resource Description Framework (RDF) is a family of specifications originally designed as a metadata data model. The RDF has come to be used as a general method for conceptual description or modeling of information that is implemented in web resources, using a variety of syntax formats.

The RDF data model is similar to classic conceptual modeling approaches, such as entity-relationship or class diagrams, as it is based upon the idea of making statements about resources (in particular Web resources) in the form of subject-predicate-object expressions. These expressions are known as triples in RDF terminology. The subject denotes the resource, and the predicate denotes traits or aspects of the resource and expresses a relationship between the subject and the object.

For example, one way to represent the notion "The sky has the color blue" in RDF is as the triple: a subject denoting "the sky," a predicate denoting "has the color," and an object denoting "blue." Therefore, the RDF swaps object for subject that would be used in the classical notation of an entity-attribute-value model within an object-orientated design (i.e., an object "sky," an attribute/argument "color" and a value "blue"). The RDF is an abstract model with several serialization formats (i.e., file formats), and so the particular way in which a resource or triple is encoded varies from format to format.

This mechanism for describing resources is a major component in what is proposed by the semantic network activity: an evolutionary stage of the World Wide Web in which automated software can store, exchange, and use machine-readable information distributed throughout the Web, in turn enabling users to deal with the information with greater efficiency and certainty. The RDF simple data model and ability to model disparate, abstract concepts has also led to its increasing use in knowledge management applications unrelated to the Semantic Web activity.

A collection of RDF statements intrinsically represents a labeled directed multi-graph. As such, an RDF-based data model is more naturally suited to certain kinds of knowledge representation than the relational model and other ontological models. However, in practice, the RDF data is often persisted in a relational database or native representations also called triplestores or quadstores, if context (i.e., the named graph) is also persisted for each RDF triple. As the RDFS and the OWL demonstrate, additional ontology languages can be built upon the RDF.

Two common serialization formats are in use. The first is an XML format. This format is often called simply the RDF (Resource Description Framework). Notation 3 (or N3) is a non-XML serialization of RDF models designed to be easier to write by hand, and in some cases, easier to follow. Because it is based on a tabular notation, it makes the underlying triples encoded in the documents more easily recognizable compared to the XML serialization. N3 is closely related to the Turtle (Terse RDF Triple Language) and N-Triples formats.

Notation3, or N3, as it is more commonly known, is a shorthand non-XML serialization of Resource Description Framework models, designed with human-readability in mind. The N3 is much more compact and readable than XML RDF notation.

The N3 has several features that go beyond a serialization for RDF models, such as support for RDF-based rules. Turtle is a simplified RDF-only subset of the N3.

N3 is based on RDF standards and is equivalent to RDF/XML syntax, but has additional features, such asrules and formulas. Rules can be written in N3, OWL, XNL, and other formats. Turtle (Terse RDF Triple Language) is a serialization format for Resource Description Framework (RDF) graphs.

Here is an example of the Turtle:
@prefix rdf: <http://www.w3.org/1999/02/22-rdf-syntax-ns#>.
@prefix dc: <http://purl.org/dc/elements/1.1/>.
@prefix ex: <http://example.org/stuff/1.0/>.
<http://www.w3.org/TR/rdf-syntax-grammar>
dc:title "RDF/XML Syntax Specification (Revised)";
ex:editor [
ex:fullname "Dave Beckett";
ex:homePage<http://purl.org/net/dajobe/>
].

Turtle examples are also valid Notation 3. The subject of the RDF statement is either a Uniform Resource Identifier (URI) or a blank node, both of which denote resources. Resources indicated by blank nodes are called anonymous resources. They are not directly identifiable from the RDF statement. The predicate is a URI, which also indicates a resource, representing a relationship. The object is a URI, blank node or a Unicode string literal.

In semantic network (semantic web) applications, and in relatively popular applications of the RDF like RSS and FOAF (Friend of a Friend), resources tend to be represented by the URIs that intentionally denote, and can be used to access, the actual data on the World Wide Web. But the RDF, in general, is not limited to the description of Internet-based resources. In fact, the URI that names a resource does not have to be de-referenceable at all. For example, a URI that begins with "http:" and is used as the subject of an RDF statement does not necessarily have to represent a resource that is accessible via HTTP, nor does it need to represent a tangible, network-accessible resource, such a URI could represent absolutely anything. However, there is broad agreement that a bare URI (without a # symbol) which returns a 300-level coded response when used in an HTTP GET request should be treated as denoting the Internet resource that it succeeds in accessing.

Any data and data types can be presented as triples. The data in the present application can include application data, in particular, process data, state machine data, data about installed hardware and software, user data, metadata, data of projects, ontologies, rules, facts, axioms, etc. The application data represents data related to a specific application (for, example, software application, such as application installed in and for HR department, IT department, accounting department, etc, and these applications can be linked, for example, through a server, internet or other communication software or hardware). The applications can relate to business applications/business software, or any set of instructions that directs a computer to perform operations. The application data can relate to computer software, which includes computer programs, libraries and non-executable data. The applications can include applications for process management, project management, program management, etc. The application data and how the applications communicate with each other and external/internal application and modules is described in detail in the U.S. Pat. No. 8,478,766 entitled "Unified data architecture for business process management", incorporated herein by reference in its entirety, and in the U.S. Pat. No. 8,725,821 entitled "System and method for project and process management by synchronizing custom objects between ms outlook and external server", incorporated herein by reference in its entirety. The data (for example, application data, business application data, user data, etc.) can be presented, for instance, as an RDF graph, or any other types of graphs. The RDF data model is similar to classic conceptual modeling approaches, such as entity-relationship or class diagrams, as it is based upon the idea of making statements about resources (in particular web resources) in the form of Subject-Predicate-Object expressions. Subject denotes the resource, and the Predicate denotes traits or aspects of the resource and expresses a relationship between the Subject and the Object. A collection of RDF statements intrinsically represents a labeled, directed multi-graph. As such, an RDF-based data model is more naturally suited to certain kinds of knowledge representation than the relational model and other ontological models. The application data (for example, user data and ontologies) can be used to describe any process and any part of the process, and to describe Items and an Item's relationship with other Items, as well as the system, or its part, to which the Items belong, their interactions with the system, etc. The Item is an entity, for example, business-entity: the task "Add a description for the picture" is the Item, an employee "Alex"—is an Item as well, a request for "The bridge building," a record in the DB for the user, IT department, HR department, or any other entity. Such entities in programming field are called class instances. So user "Alex" is an instance of the "User" Class; IT department, HR department are the instances of the "department" Class, etc. Such Items (and related ontologies, user data, rules, etc.) are the data to store in form of triples in stores. Triples (or quadruples, or more generally n-tuples, etc.) can represent business objects and rules implemented in any programming language or Comindware® expression language, see Appendix and http://d12.comindware.com/pdf/Comindware_Tracker_Administrators_Guide_en_A4.pdf, incorporated herein by reference. According to the exemplary embodiment, special names can be used for transition rules for business process. The names can be:
$property, that identifies an object;
$$now, indicating current data and time; and $$currentUser, identifying a current user.

The business rules can be stored as triples, as well. The triples can be used for tasks generated by a state machine. The conditions of relationships between the state machine's states can serve as predicates of the triple. In project management, a task is an activity that needs to be accomplished (or executed) within a defined period of time. A task can be assigned to a responsible person. The task has a start and end date (time).

A task is a unit that is used to track user activities in terms of completing certain objectives defined by the task description. An example of a task is a task within MS Outlook. Other examples of tasks can be the tasks such as fixing a bug in a computer code, report generation, replacing a car part, cargo transport, writing an executable computer module, etc.

For example, a computer code bug needs to be fixed. The process detects a bug and creates an object/item "bug." The object is processed according to a workflow that includes stages of object processing represented by states. An item within the workflow is a configurable unit that can be transitioned from state to state and used for tracking certain business process. Item transition through the workflow can generate tasks at required steps (states) and assign them to certain users.

The exemplary workflow for fixing bugs operates as follows. If a bug is detected, an order is given to a bug fixer (i.e., developer) to fix the bug. After that, the bug is considered fixed. The object "bug" can have several states such as "bug detected," "bug is under correction," "bug is corrected." When the bug is detected, the bug handling process moves to a "bug detected" step. The process orders the bug fixer (i.e., developer) to fix the detected bug. A task for the bug fixer "fix bug" is generated, and the bug object is transitioned into "bug is under correction" state.

After the bug fixer (developer) corrects the bug, the bug fixer closes his task, and the state of the bug object transitions into the state "bug is corrected." An assignee of the task closes the task upon completion. Thus, the task can have several parameters. For example, a status (open/closed), a task assignee, a generation date, a closing date, a task name, etc.

According to the exemplary embodiment, the task parameters can be described as triples. Each task can have a unique task ID (i.e., for example a number). The first task can have an ID=001, second task ID=002 and etc. Note that task ID can be generated by hashing task name or creation date. The task status can be described as a triple: 001 status opened, 002 status opened.

In this case, task id is a subject, the status is predicate and opened is an object of the triple. For example, "003 status closed" indicates that task 003 has been closed. The "003 status closed" indicates that task 003 has been closed. The triple "001 owner John" indicates that the task with the ID=001 is assigned to John. The triple "002 date 12 dec" indicates that the task with the ID=002 was created on December 12. Whenever an operation with a task is performed (for example, opening or closing the task) the corresponding triples are added to a database. Storing the triples in the database allows for retrieval of the task-related data for future use. For example, task status and assignment can be retrieved by a database query.

An exemplary query "?subject status opened" retrieves all subjects (task IDs) with an open status. In the above example, the IDs of the tasks 001 and 002 will be retrieved by this query. Note the queries can be bases on objects, predicates and subjects. However, storing triples in a relation database is inefficient. According to the exemplary embodiment, the triples are stored in B-trees, for example, in the form of key-value store(s), key store(s), table(s), which are discussed in detail herein. For example, the "key-value" or "key" in understanding of key-value store is an interface, and the B-tree is an implementation of this interface. So a key-value store (or, in some cases. some key-value stores, or the key store, or key stores, or the table, or some tables as described below) is representable by at least one B-tree. On the other hand, at least one key-value store (and/or value store) can be represented by at least one table, and at least one table can be represented by at least one B-tree or by at least one store (key store, key-value store). Also, at least one B-tree can be represented by at least one key-value store(s).

According to the exemplary embodiment, graphs can be represented by the triples.

FIG. 1 illustrates an exemplary graph. This graph can be defined by a number of triples:

Task 1—owner (assignee) is John;
Task 1 status—closed;
Task 2—owner (assignee) is Alex;
Task 2 status—opened;
Task 2—owner (assignee) is Alex;
Task 3 status—closed.

In this example, the "owner" and the "status" are predicates (P), the Task 1 and the Task 2 are subjects (S), and John and Alex are objects (O) of the triples.

The above triples can be written as:

S1 P1 O1,
S1 P2 O2,
S2 P1 O4,
S2 P2 O3,
S3 P1 O4,
S3 P2 O2.

The triples, written in the above form, represent the relations between predicates, objects and subjects. These triples can be written as functions of the predicates:

P1(S1, O2),
P1(S2, O4),
P1(S3,O4),
P2 (S2, O3),
P2(S3, O2).

If all the tasks assigned to Alex need to be found, all the triples need to be searched through in case of relational databases, which is extremely expensive and time consuming. If a number of triples exceeds, for example, a thousand, the search through triples becomes very slow and requires enormous computational resources. According to the exemplary embodiment, a B-tree is used for storing triples, quadruples (where predicate links three arguments), quintuples (where predicate links four arguments), etc. represented by graphs.

Note that the actual graphs are not stored, but the corresponding triples (quadruples, quintuples, etc.) are stored in the B-tree.

In the example depicted in FIG. 1, predicates serve as edges of the graph and object and subjects serve as nodes (peaks) of the graph. In FIG. 1, graph (G) represents a combination of two sets: nodes V (for example, Task 1, John and Alex) and edges E (predicates 1, 2, 3, etc.). The two sets are combined bases on an instance (for example, a state of a workflow).

Each edge e from the set E incidentally equals to nodes v', v" connected by that edge. The node v' and the edge e are considered coincident, and the nodes v' and v" are considered adjacent. If $|V(G)|=n$, $|E(G)|=m$, then graph G is (n,m) graph, where n—is a power of the graph (i.e., triple, quadruple, quintuple, etc.) and m is graph size.

Figure 2:
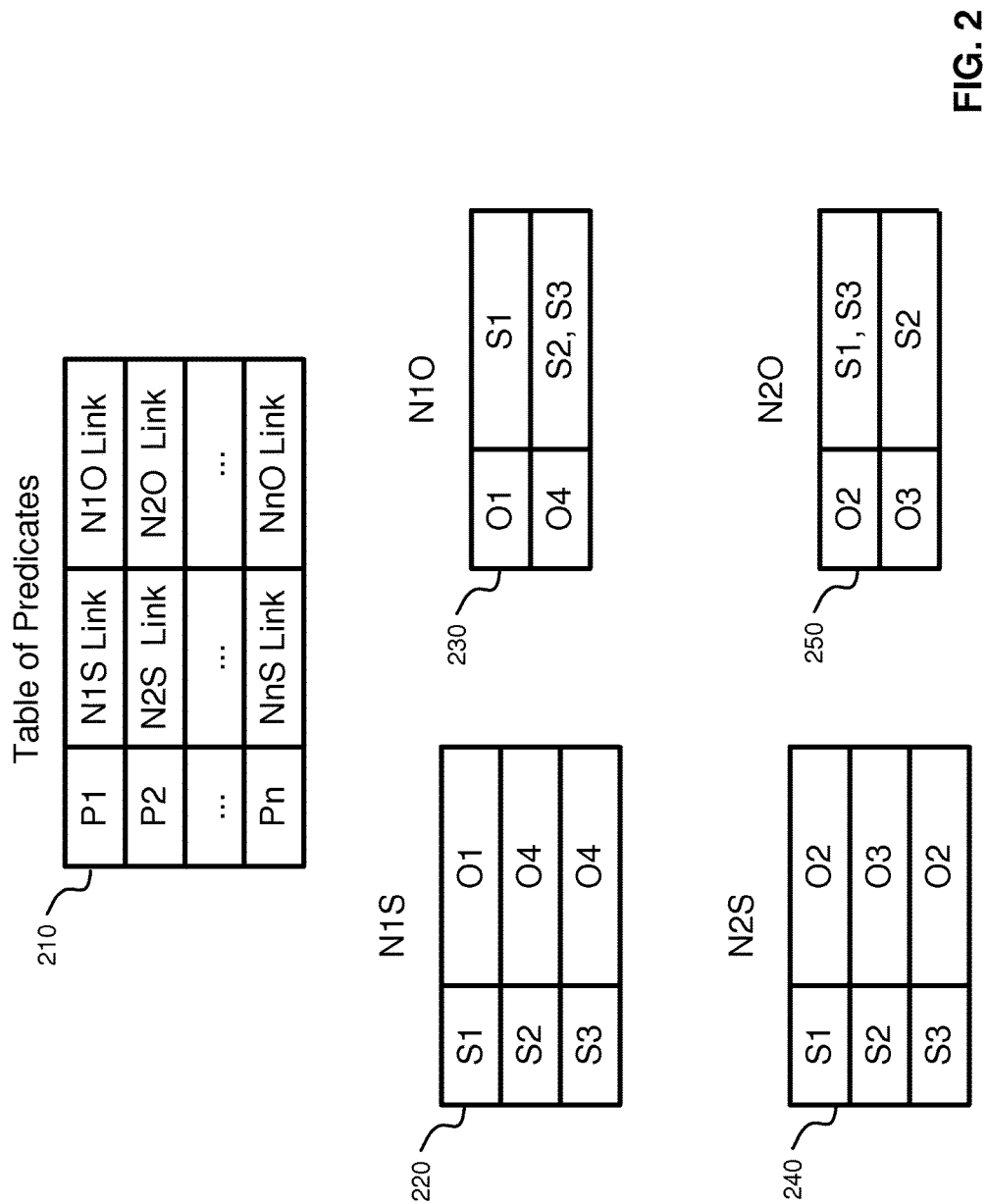
FIG. 2 illustrates a database with a B-tree structure for storing triples, in accordance with the exemplary embodiment.

According to the exemplary embodiment, data storage in a form of a B-tree is used in order to make searches more efficient. The B-tree can be implemented/represented as a set of tables/stores (key-value stores, key-stores, value stores). FIG. 2 illustrates a database with a B-tree structure for storing triples depicted in FIG. 1. According to the exemplary embodiment, data in the key stores and key-value stores, such as predicates, arguments (for example, Objects and Subjects), links, etc. are stored in a database in a hashed from. In other words, task, status, owner values, and data describing workflow (for example, business workflow) and/or process (such as a process of business control, software development process/projects, department management, such as HR-department processes, etc.) can be hashed prior to storage in the table/store (for example, in the key-value store or in the key store). Hashing allows for speed up of a search process. Also, sorting data in the key-value stores and key-stores by keys allows to increase the data search speed. Sorting of stores data in the stores can be performed at any time during the existence of key-value stores and/or key stores. Also, previously hashed data can be inserted to the store (key store and/or key-value store) in the right place of the store according to the sorting (the existing order in the store). Note that the data in the stores are sorted by keys.

The database (in particular, in some key-value stores and/or key stores) search is performed by predicates in order to find relations between the graph nodes. Thus, a key-value store in the database/B-tree is, in particular, a store (or table) containing relations between the predicates and arguments, such as the Subjects and the Objects, and can contain the Objects, the Predicates, the Subjects, links to other key-value stores and/or key stores. Note that the stored argument in one store as key can be stored as value in other store, i.e., a stored Object in the N1S key-value store as value can be stored in the N1O as key at the same time. Also note, stored Subject in one key-value store (or key-store) as key also can be stored as key (in this case as Object or as Subject) in the other key-value (or key store) as key. This assumption applies to all types of data (for example, for arguments, such as Subjects, Objects, etc.), The arguments in the key-value store/table can be sorted, for example, by hashed values of arguments, in particular stored as keys in key stores and/or key-value stores. Note that predicates, links and other data and metadata (which can provide data about data location, for data search, for sorting data in database, etc.) also can be hashed. In some cases predicates in the predicates key-value store is not sorted by hashes. Table of predicates (predicate key-value store/connector key-value store) 210 contains predicates P1 . . . Pn used for selecting the Subjects and the Objects, and served as keys in the key-value store.

Note that the predicate key-value store (connector key-value store) can be a hash table (hash map) instead of a B-tree. In this case data in the hash table can be stored with or without data sorting by keys.

Also note that data in the predicate key-value store can be stored with or without store content sorting, for example, by keys.

Note that this method of storing data is not limited to tasks of the triples. Any directly or indirectly related/linked data can be stored in the stores with or without storing these relations. The data of quadruples, etc. can be stored in the key-value table(s) and key stores. N1S Link . . . NnS Link are values in the predicate table that represent links to table N1S . . . NnS (220 and 240 accordingly). The links also can be hashed before storing to store. The tables 220 and 240 (in particular, a key-value stores) represent relations between the Subject and the Objects of Subject-Predicate-Object (SPO) triples. The predicates key-value store 210 also contains links to key-value stores N1O . . . NnO (230 and 250 accordingly) that also represent relations between the subject and the objects. For some predicates (i.e., for predicates of one type), for example, P1=owner, a set of its own key-value stores/tables N1S . . . NnS is created, and for other types of predicates, for example, P2=name a different set of tables N1O . . . NnO is created. In one embodiment of the invention, the value for the predicate in the predicate key-value store is represented by a pair of links to argument key-value store(s) (in this case, 220, 240, 230, 250), so N1Slink and N1OLink is a pair of links to argument key-value stores for P1 predicate. Note that the value in any key-value store can be represented by any number of links to other B-trees, to other key-value stores and key stores, and/or can be represented by any number of "sub-values", such as Object-subvalues, Subject-subvalues, terminator-subvalues, i.e., Object, Subjects and Terminators. An example of such links for predicates is represented on the FIG. 3 as Link1, Link2, Link3, Link4 for predicate P1, so value (Link1, Link2, Link3 and Link4) is value for P1 key. Such data (in particular links, Objects, Subjects and Predicates) in the key-value stores and key-stores can be stored in any known format of data storing and can be hashed, archived, compiled, converted to intermediate state for accessing, etc. Also, metadata about data/triples in the stores can be stored together with such data/triples. Such metadata can include an archive type of archived data, location of stored data and key-value stores, key stores, terminator stores (particular form of argument key-value store with terminator(s) only), B-trees, the information about distributions of data/triples between stores and B-trees, the information required for data/triple processing (i.e. data writing, reading, deleting, unpacking, etc.), etc.

Note that (S2, S3) Subjects in N1O (key-value) store/table 230 and (S1, S3) Subjects in N1O (key-value) store/table 250 are stored in these stores, but stores can be created for each set of arguments (Subjects, or Objects). In other words, the store (for example, key store) can be created for set or arguments S2 and S3, and the store can be created for set of arguments (S1, S3). So additional store (for example, key-store) can be created for values (for example, for each value, wherein value is a set of subvalues, such as (S2, S3) and (S1 and S3)) in the key-values stores. In one embodiment of the invention, it is possible to store all arguments in corresponding (appropriate) key-value stores. In another embodiment of the invention, part of the arguments (at least one argument) are stored in the argument key-value store(s), but another part of the arguments (at least one arguments) are stored in the other additional stores (at least one store), such as additional argument key stores. In this case the links will be created in argument key-value stores which will point to corresponding argument key stores.

The above example uses the triples that use only two related values (arguments/attributes). Any node of the graph can be used as an arguments. In cases when more than two related arguments/attributes are uses, such as P1 (a1, a2, a3), an alternative method for storing is employed. A B-tree is also used.

An example of a predicate with three arguments can be a statement: "a cup color red yesterday" or "color(a cup, red, yesterday). In other words, the "color" is a predicate, and "cup" is a subject, "red' is the object, and "yesterday" is circumstances (arguments/attributes) of this predicate. An example of a predicate with four arguments can be a statement: Europe ("France," "Germany," "Spain," "Italy"). All arguments: France, Germany, Spain and Italy are countries. A common relation is that they are the countries in Europe. Thus, Europe is the predicate. A predicate "write" built into a programming language, such as Prolog, can be used. This predicate is responsible for passing data to a computer screen. Such predicates do not require special description in the code and can be easily used: write("A synonym for 'brave' is")

The quotes in this statement are used for defining a line of symbols: "A synonym for 'brave' is". The predicate "write" can contain names of variables. In this case the quotes are not required.

A simple example is: write(X), where X is a name of a variable. If X value is "darling", then "write" will print the word "darling."

Both a line of symbols and a variable are arguments/attributes of the predicate "write." The arguments/attributes can be mixed in an arbitrary manner according to syntax rules. For example, write("Today is the ",N,"th day of ",M,", a ",D,".").

This predicate will print "Today is the 19th day of August, a Tuesday.", if the values of the variables N, M and D are "19", "August" and "Tuesday," accordingly.

In this example "write" is a predicate and:
"Today is the"
N
"the day of"
M
".a"
D
"."

are the seven arguments/attributes of this predicate. In other words, the predicate is to the power of seven.

Consider a B-tree that needs to store the following sets:
a first set P1(a1, a2, a3);
a second set P1(a1);
a third set P1(a1, a4);
a fourth set P1(S1, O4);
a fifth set P1(a1, a5).

Figure 3:
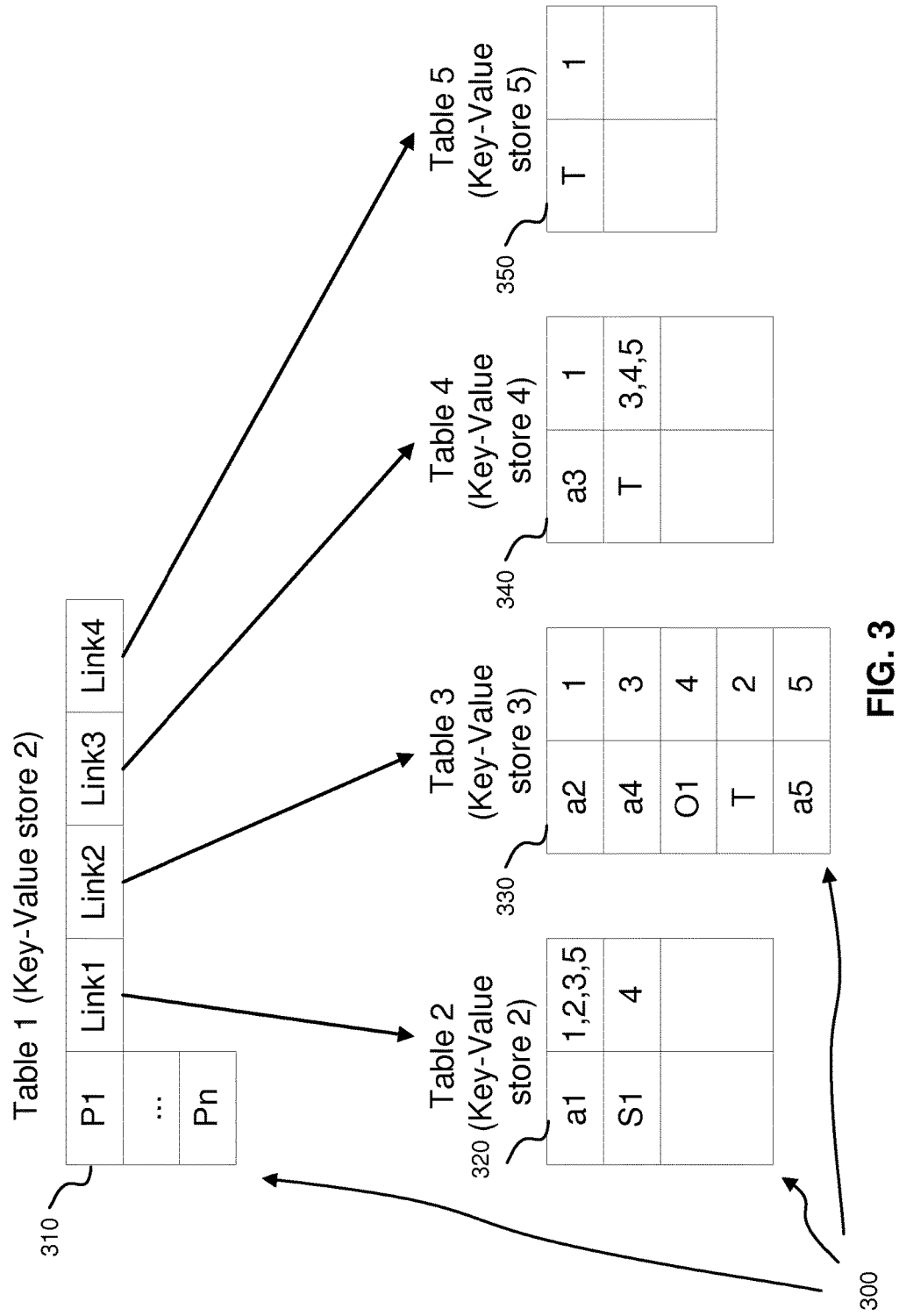
FIG. 3 illustrates an example of storing predicates with corresponding arguments (attributes), in accordance with the exemplary embodiment.

FIG. 3 illustrates an example of storing predicates with their attributes in a B-tree, in in accordance with the exemplary embodiment. A table of predicates 310 contains predicates in sorted in a particular order. The table of predicates 310 also contains links to corresponding stored arguments for each of the predicates.

Writing of the predicates and their corresponding arguments into key-value stores 300 (which can be implemented/represented as B-trees) is implemented as follows: first set of the predicate P1 has a power of three (i.e., the predicate has three arguments). Therefore, when a first set is written into the key-value store (table) 310, the key-value store (table) 310 contains four links to the stored arguments. The first link (Link1) references a key-value store (table) 320 containing all first arguments (i.e., the arguments placed first in all of the sets). The second link (Link2) points to a table 330 containing all second arguments of all the sets. The third link (Link3) points to a table 340 which contains all of the third arguments. The fourth link (Link4) is an additional link that points to a table 350, which contains a terminator.

As noted above, (Link1, Link2, Link3, Link4) is value for P1 predicate key. Note that such value can be represented by array(s), string(s), arrayList(s), list(s) (etc.) of subvalues (Link1 is a subvalue, Link2 is a subvalue, Link3 is a subvalue, Link4 is a subvalue and they are elements, for example, of an array and, for example, can be represented as one element of a store), or by any other known format or data storing. In one embodiment of the invention such values can be stored in key stores (for example, in key stores such as the key store 420 or 430 on FIG. 4), but where subvalues are stored instead of identifiers shown on FIG. 4. So Link1, Link2, Link2, Link3, Link4 can be stored in a separate store (for example, the key store).

According to the exemplary embodiment, the terminator is a constant value (numerical or text). The terminator is used for retrieving the data (in the form of triples, for example) from the key-value stores 300. The triples within each statement are identified within the key-value stores by the indentifier and end of the triple set are marked by the terminator. When the arguments are read from the key-value stores 300, the search continues until the terminator corresponding to a particular statement/triple is found.

Each set of arguments along with a corresponding predicate is assigned an identification number upon being written into the at least one key-values store 300. The next identification number is incremented by one. Therefore, the data sets are ordered according to when they are written into the key-value store(s) 300. Thus, each set (a predicate, arguments and a terminator) has a corresponding unique identifier also stored in the key-value store(s) 300.

Additionally, each argument has a position id, which identifies the position of the arguments in a set (i.e., first, second, third, etc.). In the example depicted in FIG. 3, the first set contains an argument "a1" in the first position. Thus, the argument "a1" is written into the key-value store (table) 320 with the identifier "1" indicating that the argument belongs to the first set.

An argument "a2" is second in the first set. Therefore, it is written into the key-value store (table) 330 with the identifier "1." An argument "a3" is third in the first set. Therefore, it is written into the key-value store (table) 340 with the identifier "1." The terminator with the identifier "1" is written into the key-value store (table) 350. The terminator "1" indicates that there are no more arguments of the first set. In this case the key-value store 350 is a terminator key-value store, which is an argument key-value store.

An argument "a1" is first in the second set. Therefore, it is written into the key-value store (table) 320 with the identifier "2", which indicates that the argument "a1" belongs to the second set. The second set has only one argument. Thus, the terminator with the identifier "2" is written into the key-value store (table) 330.

Figure 4:
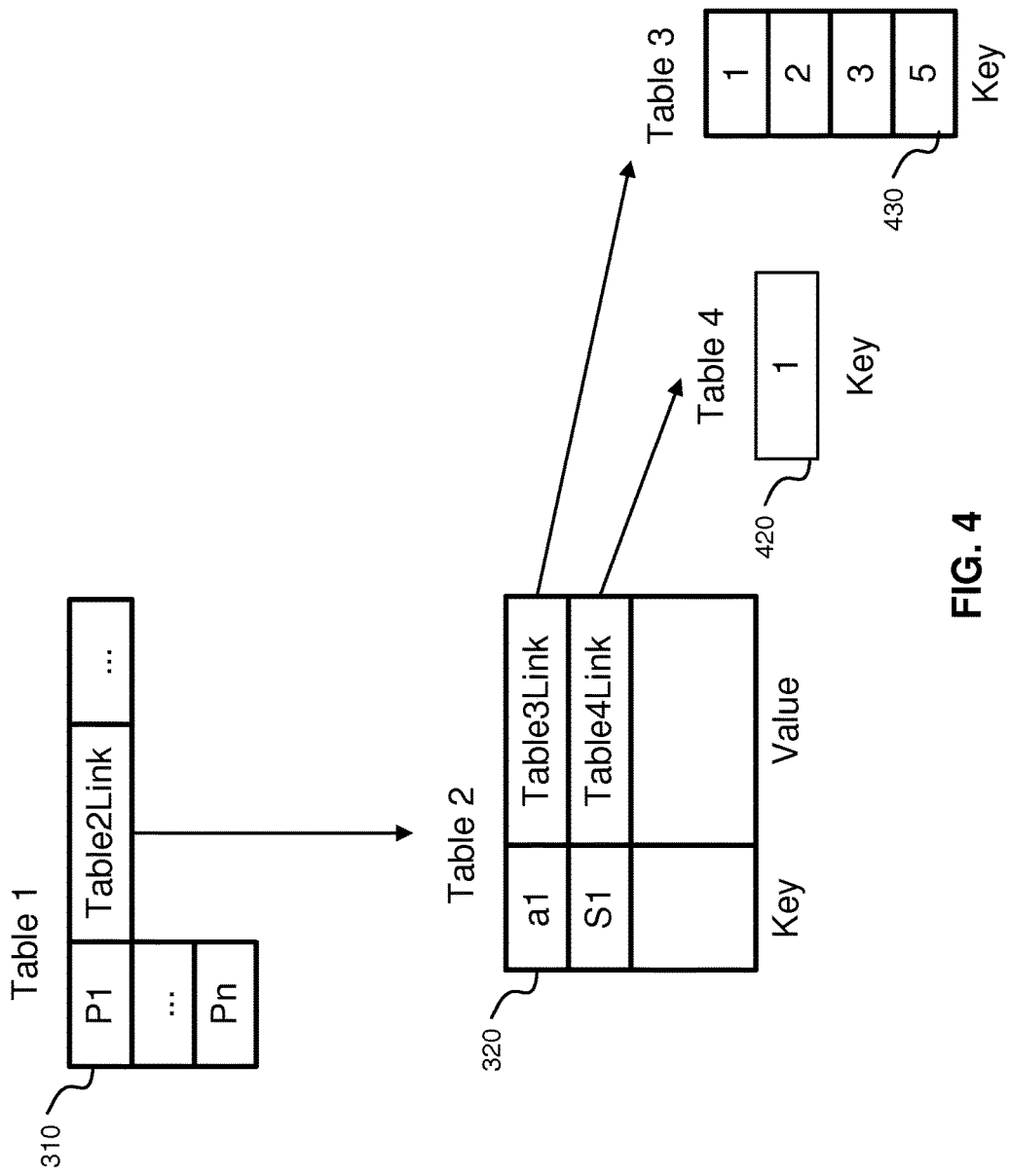
FIG. 4 illustrates example of storing predicates with their arguments/attributes by using additional links.

For all other sets, the predicates, the arguments and the terminators are stored in the same manner. Note that the key-value stores 320-350 can contain the links to other tables instead of the actual identifiers. This example is depicted in FIG. 4. The key-value store 310 contains the link (Table 2Link) to the key-value store 320. The table 320 contains links (Table3Link and Table4link) that point key stores 420 and 430 that contain the identifiers.

Note that the key-value stores and key stores depicted in FIGS. 3 and 4 can be represented/implemented as B-trees. In another embodiment of the invention, the key-value stores can serve as branches of the B-tree. If a particular data set (the predicate with the arguments) needs to be retrieved from the B-trees, the predicate, the arguments and the terminator are searched for based on the corresponding identifier.

For example, if a first set needs to be retrieved, the first set "P1" is found in the key-value store 310. Then, the corresponding arguments are read from the key-value stores 320, 330, 340 and 350. The arguments with the identifier "1" are found in the key-value stores 320-350. Therefore, the arguments are retrieved in order they are placed in the original set (i.e., the first argument is placed first, the second—second, etc.). The terminator is found in order to make sure that all the arguments from the set have been retrieved.

When reading a set from the key-value store, the following approach can be used (for triples, triplets, quadruplets, quintuplets, n-tuples, etc.):

As an example, consider a case where it is necessary to find set P1 (a1,a4). Argument a1 is in the first place, and argument a4 is in the second, therefore, the search is done in Key-value store 2/Table 2 (320) and in Key-value store 3/Table 3 (330). Also, Key-value store 4/Table 4 (340) needs to be searched, where the terminator is written to, as described above.

From Key-value store (Table) 320, argument a1 is read, and identifiers of a1 are also read. Then, in key-value store (Table) 330, argument a4 is found, and identifiers of a4 are also found. Then, key-value store (Table) 340 is read for identifiers of the terminator.

Then, a search is performed for intersecting identifiers for a1, a4 and the terminator.

Taking the first identifier ("1") for a1, which means that argument a1 belongs to the first predicate written in the B-tree.

Then, considering the identifiers for argument a4, the first identifier is "3", which means that argument a4 is located at the third predicate in the B-tree (and possibly in subsequent ones as well). Then, the set of identifiers for argument a4 becomes the master for the search for intersecting identifiers. The set of identifiers for argument a1 becomes a dependent set of identifiers, and the set of identifiers for the terminator is also dependent, and is after the a1 identifiers.

Then, a search is performed for an identifier of argument a1 that is equal to "3". Then, an identifier equal to "3" needs to be found in the set of identifiers for the terminators. Once found, it means that P1(a1,a4) exists in the B-tree. The set of identifiers for the terminators becomes the master set, and the process of finding the identifiers continues in the same vein.

Another example is as follows:

Consider a case where all the predicates P1(a1,?) need to be found. "?" here means that it is necessary to look for predicates of power 2, where the subject is argument a1, and the object is any other argument, e.g., a5, a0, a2 etc. Since the power of the predicate is 2 (as in the previous example), it is necessary to search the key-value stores 320, 330 and 340. As in the previous example, it is necessary to read the set of identifiers for argument a1 and the set of identifiers for the terminators. The second argument is not known, therefore, the search process is as follows:

The set of identifiers for a1 is read from key-value store 320 and the set of identifiers for the terminators is read from key-value store 340. Then the set of identifiers for the first argument (here, a2) is read from key-value store 330, and the intersecting identifiers are determined, as discussed earlier.

Once all the intersections are determined, the set of identifiers for the next argument is read from key-value store 330 and all intersections are also determined.

The process continues until all identifiers for all arguments are read from key-value store 330, and compared to the set of identifiers fro argument a1 and the terminators.

The search for remaining predicates is done in a similar manner.

Figure 5:
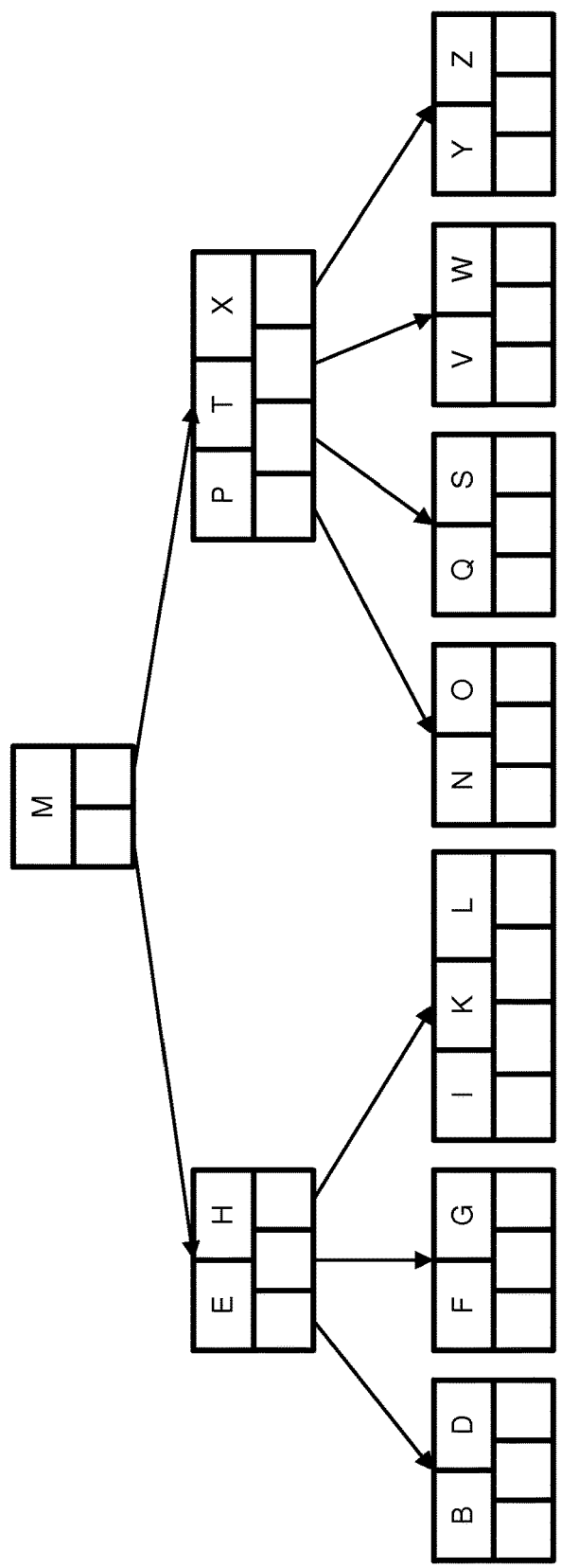
FIG. 5 illustrates an example of a B-tree of an order of 5.

FIG. 5 illustrates an example of a B-tree of order 5. This means that (other than the root node) all internal nodes have at least ceil(5/2)=ceil(2.5)=3 children (and hence at least 2 keys). Of course, the maximum number of children that a node can have is 5 (so that 4 is the maximum number of keys). According to condition 4 (see below), each leaf node must contain at least 2 keys. In practice, the B-trees usually have orders a lot larger than 5. The B-tree is a tree data structure that contains sorted data and allows searches, sequential access, insertions, and deletions in a logarithmic time. The B-tree is a type of a binary search tree, which has more than two children per node.

In the B-trees, internal (non-leaf) nodes can have a variable number of child nodes within a pre-defined range. When data is inserted or removed from a node, the number of child nodes changes. In order to maintain the pre-defined range, the internal nodes can be joined or split. Because a certain range of the child nodes is allowed, the B-trees do not need to be re-balanced, as frequently as other self-balancing search trees. However, they may waste some space, since nodes are not entirely full. The lower and upper bounds on the number of child nodes are typically fixed for a particular implementation. For example, in a 2-3 B-tree (often simply referred to as a 2-3 tree), each internal node may have only 2 or 3 child nodes.

Each internal node of a B-tree contains a number of keys. In practice, the keys take up the most space in the node. Each internal node of a B-tree contains a number of keys. Usually, the number of keys is chosen to vary between d and 2d. The factor of 2 guarantees that the nodes can be split or combined. If an internal node has 2d keys, then adding a key to that node can be accomplished by splitting the 2d key node into two d key nodes and adding the key to the parent node. Each split node has the required minimum number of keys. Similarly, if an internal node and its neighbor each have keys, then a key may be deleted from the internal node by combining it with its neighbor. Deleting the key would make the internal node have d−1 keys. Joining the neighbor would add d keys plus one more key brought down from the neighbor's parent. The result is an entirely full node of 2d keys.

The number of branches (or child nodes) from a node is one more than the number of keys stored in the node. In a 2-3 B-tree, the internal nodes store either one key (with two child nodes) or two keys (with three child nodes). The B-tree can be described with parameters (d+1)−(2d+1), or simply with the highest branching order (2d+1).

The B-tree is kept balanced by requiring that all leaf nodes are located at the same depth. The depth increases slowly as elements are added to the tree, but an increase in the overall depth is infrequent and results in all leaf nodes being one more node further away from the root.

The B-trees have substantial advantages over alternative implementations when node access times far exceed access times within the nodes, because the cost of accessing the node can be amortized over multiple operations within the node. This usually occurs when the nodes are in secondary storage such as disk drives. By maximizing the number of child nodes within each internal node, the height of the tree decreases and the number of expensive node accesses is reduced. In addition, rebalancing the tree is needed less often.

A maximum number of child nodes depends on the data that must be stored for each child node, and the size of a full disk block or an analogous size in a secondary storage. While 2-3 B-trees are easier to explain, practical B-trees using secondary storage require a higher number of child nodes to improve performance.

Unlike a binary-tree, each node of a b-tree can have a variable number of keys and children. The keys are stored in a non-decreasing order. Each key has an associated child that is the root of a sub-tree containing all nodes with the keys less than or equal to the key, but greater than the preceding key. A node also has an additional rightmost child that is the root for a sub-tree containing all keys greater than any keys in the node.

Since each node tends to have a large branching factor (a large number of children), it is necessary to traverse relatively few nodes before locating the desired key. If access to each node requires a disk access, then a B-tree will minimize the number of disk accesses required. The minimization factor is usually chosen so that the total size of each node corresponds to a multiple of the block size of the underlying storage device. This choice simplifies and optimizes disk access. Consequently, a B-tree is an ideal data structure for situations where all data cannot reside in a primary storage and accesses to a secondary storage are comparatively expensive (or time consuming).

For n greater than or equal to one, the height h of an n-key B-tree T of height h with a minimum degree t greater than or equal to 2, $$h \leq \log((n+1)/2)$$

The worst case height is O(log n). Since the "branchiness" of a B-tree can be relatively large compared to many other balanced tree structures, the base of the logarithm tends to be large. Therefore, the number of nodes visited during a search tends to be smaller than required by other tree structures. Although this does not affect the asymptotic worst case height, the B-trees tend to have smaller heights than other trees with the same asymptotic height.

The B-tree must satisfy the following conditions:

Each node contains at least one key. The keys at each node are ordered. The root node contains from 1 to 2t−1 keys. Any other node contains from t−1 to 2t−1 keys (the leaves are not excluded). Where t is a tree parameter that is no less than 2 (typically is in the range 50 to 2000);

The leaves do not have children. Any other node having keys K1, . . . Kn, contains n+1 children, where:

a first child and all its children have the keys from the interval (-infinity, K1);

for 2 less or equal to i that is less or equal to n, i-th child and all its children contain the keys from the interval (Ki−1, Ki);

(n+1)-th child and all its children contain the keys from the interval (Kn, infinity);

all leaves have the same depth.

The second condition can be states as: each node of the B-tree (except for the leaves) can be considered as an order array consisting of the keys and references to the children in an alternating order.

According to the exemplary embodiment, if the key is contained in the root, it is easily found. Otherwise, the interval is determined and a corresponding child is found. These operations are repeated until the process reaches the leaf.

Figure 6:
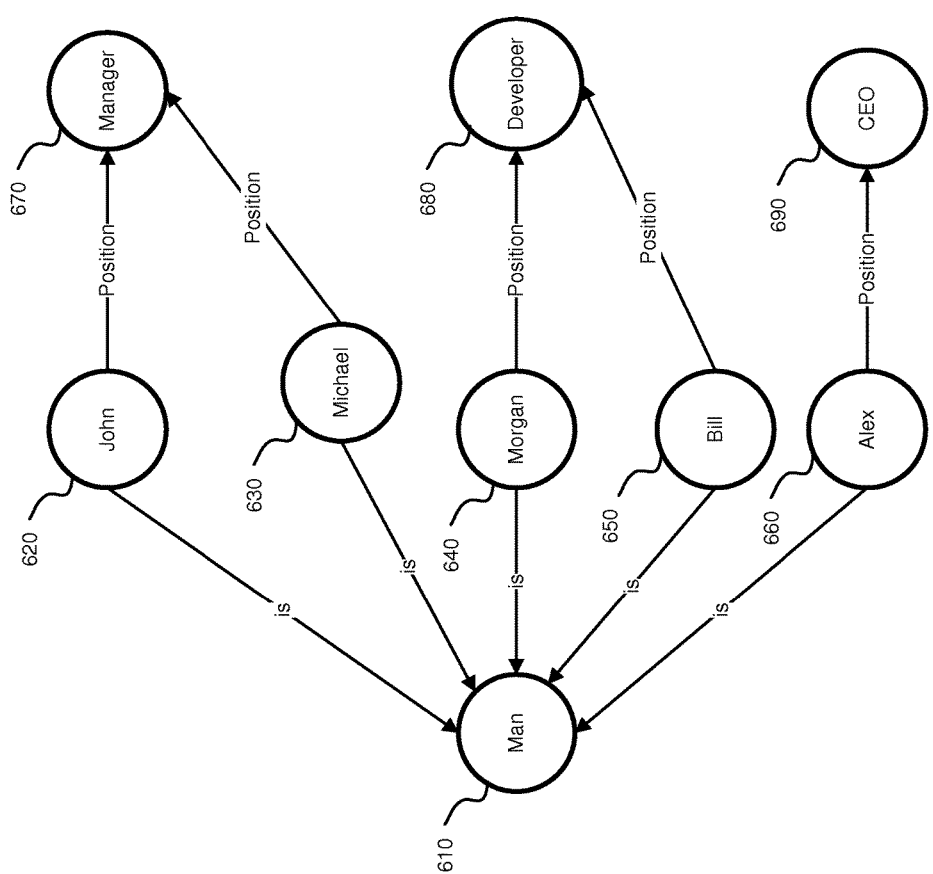
FIG. 6 illustrates another example of a graph that can be written in a form of triples.

FIG. 6 illustrates an exemplary graph that can be written in a form of triples. The exemplary graph can be written in form of ten triples:

John is a man (relation 620 to 610);
Michael is a man (relation 630 to 610);
Morgan is a man (relation 640 to 610);
Bill is a man (relation 650 to 610);
Alex is a man (relation 660 to 610);
John position manager (relation 620 to 670);
Michael position manager (relation 630 to 670);
Morgan position developer (relation 640 to 680);
Bill position developer (relation 650 to 680);
Alex position CEO (relation 660 to 690).

The same triples can be written as follows:
Is (John, a man);
Is (Michael, a man);
Is (Morgan, a man);
Is (Bill, a man);
Is (Alex, a man);
Position (John, manager);
Position (Michael, manager);
Position (Morgan, developer);
Position (Bill, developer);
Position (Alex, CEO).

Figure 7:
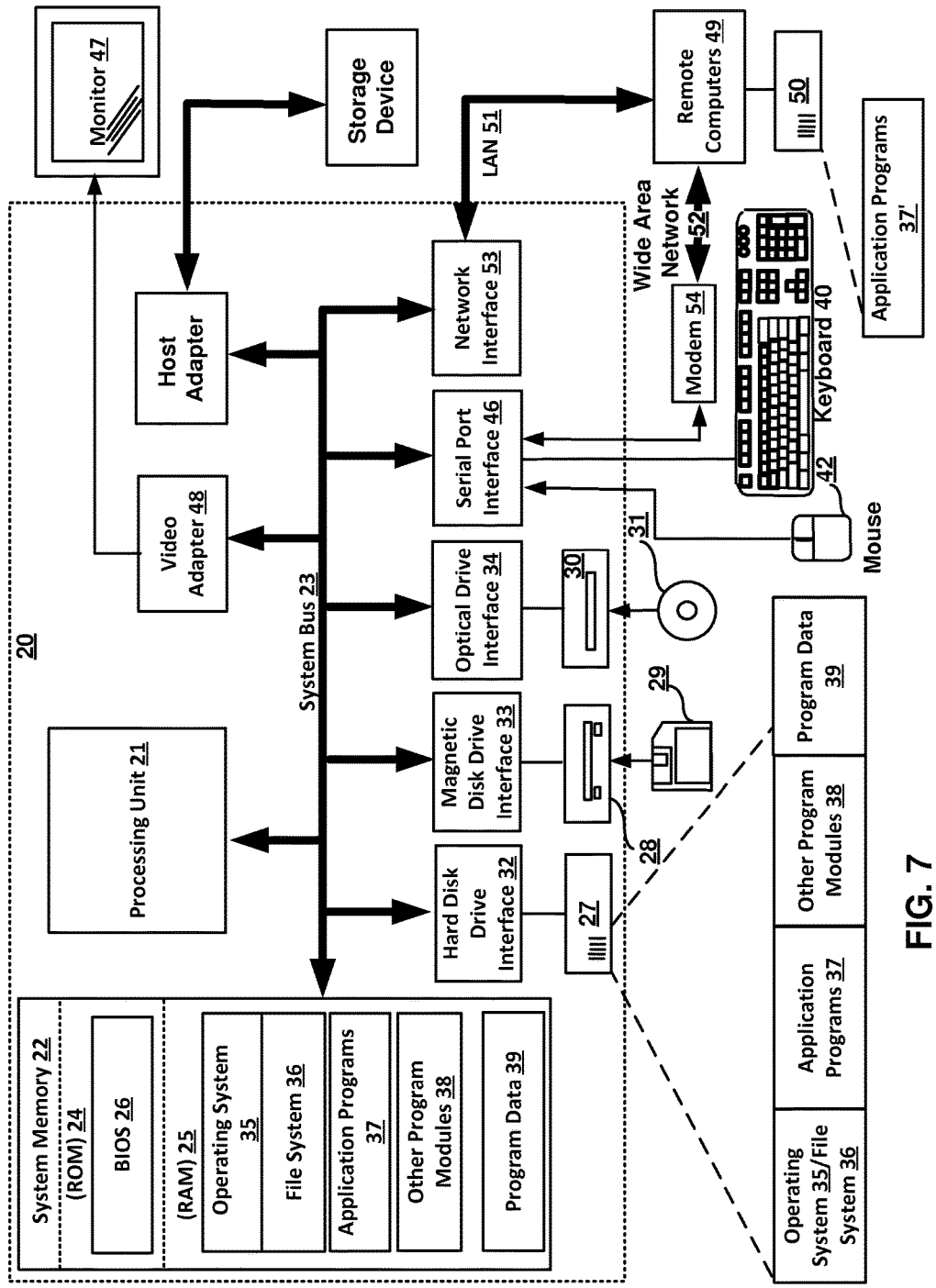
FIG. 7 illustrates a schematic of an exemplary computer system that can be used for implementation of the invention.

With reference to FIG. 7, an exemplary system for implementing the invention includes a general purpose computing device in the form of a computer 20 or a server, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 8:
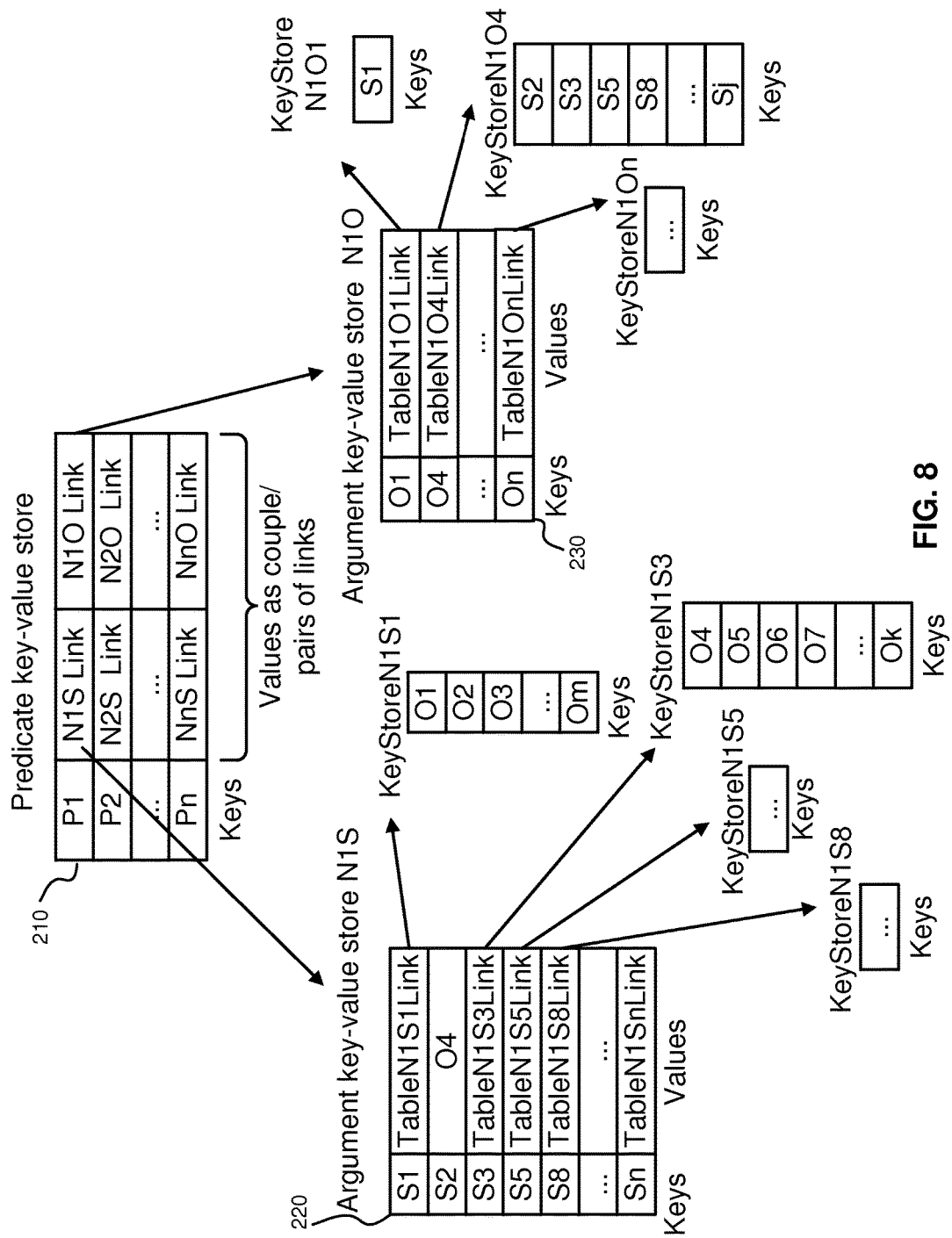
FIG. 8 illustrates example of storing data, in accordance with the exemplary embodiment.

As noted above, in one embodiment of the invention all arguments can be stored in corresponding/appropriate key-value stores. In another embodiment of the invention, part of arguments (at least one argument/attribute) are stored in the argument key-value store(s), but other part of arguments (at least one arguments) are stored in the other additional stores (at least one store), such as an additional argument key stores. In this case the links will be created in the argument key-value stores which will point to corresponding argument key stores. FIG. 8 illustrates an embodiment where the arguments are stores in argument key-value stores and/or in additional key store. The predicate key-value store 210 store the predicates as keys and links to argument key-value stores N1S (220) and N10 (230). The argument key-value store 220 store arguments S1 . . . Sn as keys and store arguments, such as O1, and links to key stores (N1S1, N1S2 . . . N1Sn) as values. Note that the argument key-value store can store as values only links to key value stores, or can store only arguments, or can store both arguments and links to key stores. In turn key store stores arguments, in this case O1, O2, O3, O5 . . . On, as keys. In this embodiment of the invention, the argument key-value store N10 (230) is store, wherein the argument key value store stores arguments (Subjects in this case) as keys and links to argument key store as values in the key-value store(s). In this case, the values in the key-values store do not contain any arguments. Note that in the another embodiment of the invention the key-value store can store both arguments as values and links as values, such as shown in the argument key-value store 220. In other words, stores 220 and 230 are particular cases of storing arguments in key-values stores, and can be implemented in any described form. Note that in another embodiment of the invention, the key-value store initially has the form of the key-value store shown on FIG. 2, and then can take form which is shown on FIG. 8. So at least one additional key store (N1S1, N1S2, N101, etc.) can be creates when the number of stored arguments to key-value store' values exceeds a predefined/predetermined amount, for example, 1, 2, 20, etc. In this case, a key store can be created for this set of arguments and links to the key store will be created and stored instead of previously stores argument(s) in the corresponding value of key-value store (e.g., a cell of the table).

Also note in other embodiment of the invention key-value store can be used instead of key store for storing arguments, predicates, etc.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

APPENDIX

Comindware expression language

1. Grammar

All syntax diagrams are presented in EBNF (Extended Backus-Naur Form) notation.

1.1. Expression expression=
|expression 'OR' expression
|expression 'AND' expression
|'NOT' expression
|expression '==' expression
|expression '!=' expression
|expression '>'<expression
|expression>'<' expression
|expression '>=' expression
|expression>'<=' expression
|expression>'*' expression
|expression>'%' expression
|expression>'/' expression
|expression>'+' expression
|expression '-' expression
|'-' expression
|'(' expression ')'
|'True'
|'False'
|'Null'
|function
;
|reference
|number
|string
|name

1.2. Function function=name '(' expression? {{',' |';' } expression}*')';
Where name is function name, expression list in brackets—function arguments. Function names are case-insensitive.

1.3. Reference reference: name {{'→' name}|{'←' name}};
Forward arrow reference navigates the properties in direct way, i.e. from referencing object to referenced object. E.g. account→manager yields manager value for account. Backward arrow navigates from referenced object to referencing object. E.g., account.1←assignee yields object which references account.1 in its assignee property.

1.4. Number

1.5. String

String literal in single or double quotes. '\' is escape char.

1.6. Name

Object or function name. Can contain alphanumeric characters, '_' and '.'. Starts with alpha character or '_'.

2. Special Names $—current item. $property is a short form for $→property.
$$now—current day and time.
$$currentUser—authenticated user id.

3. Functions object SUM (object[ ] list)
Adds all values in a list (applicable to numbers, dateTimes, durations)
object MIN (object[ ] list)
Finds minimal value in a list
object MAX (object[ ] list)
Finds max value in a list
object AVERAGE (object[ ] list)
Finds average value in a list
object[ ] AVERAGE (object[ ] list, integer n)
Takes first n elements from a list and returns them.
object[ ] SKIP (object[ ] list, integer n)
Skips first n elements from a list and returns the rest.
object FIRST (object[ ] list)
Returns first element from a list.
object[ ] DISTINCT (object[ ] list)
Returns list containing only distinct elements from a given list.
boolean EQUALS (object a, object b)
Checks if two objects are equal.
boolean NOTEQUALS (object a, object b)
Checks if two objects are not equal.
boolean LESS (object a, object b)
Checks if first object is less than second.
boolean GREATER (object a, object b)
Checks if first object is greater than second.
boolean LESSEQUALS (object a, object b)
Checks if first object is less than or equals to second.
boolean GREATEREQUALS (object a, object b)
Checks if first object is greater than or equals to second.
boolean CONTAINS (object[ ] list, object e)
Checks if list contains given element.
boolean NOTCONTAINS (object[ ] list, object e)
Checks if list does not contain given element.
integer COUNT (object[ ] list)
Returns number of elements in a list.
boolean EMPTY (object[ ] list)
Checks that list is empty.
date DATE (string value)
Used to construct date literals from string.
duration DURATION (string value)
Used to construct date literals from string.
object[ ] LIST (object v1, object v2, . . . object vn)
Used to construct list literals from values.
date STARTOFDAY (date value)
Returns start of day value for a given date/time.
boolean NOT (boolean value)
Negates boolean value.
boolean AND (boolean a, boolean b, . . . )
Checks if all conditions are true.
boolean OR (boolean a, boolean b, . . . )
Checks if any condition is true.
object IF (boolean condition, object a, object b)
Returns 'a' if condition is true, 'b' otherwise.
bool HISTORYF (object item, date periodBegin, date periodEnd, object[ ] events, object[ ] users)
integer HISTORYC (object item, date periodBegin, date periodEnd, object[ ] events, object[ ] users)

4. Operator precedence

| Level | Operators |
| --- | --- |
| 1 | ( ) Bracketed expression |
| 2 | * (Multiply), / (Division), % (Modulo) |
| 3 | + (Positive), − (Negative), + (Add), − (Subtract), |
| 4 | ==, >, <, >=, <=, != (Comparison operators) |
| 5 | NOT |
| 6 | AND |
| 7 | OR |

What is claimed is:

1. A computer-implemented method for storing and displaying application data, the method comprising:
generating graphs that represent the application data, the graphs having a plurality of nodes that correspond to arguments of triples and connecting edges that represent predicates of the triples, wherein the triples describe business entities and processes operating with the business entities using subjects-predicates-objects, and represent the predicates and the arguments associated with the predicates, and
wherein the predicates express relationships or connections between the arguments, which are the subjects and the objects of the triples, with the subjects representing an identifier of the business entities, and the objects are values of properties of the business entities;
storing the predicates in a predicate key-value store;
storing the arguments in argument key-value stores; and
storing links to the argument key-value stores in the predicate key-value store for corresponding predicates stored in the predicate key-value store;
determining, in response to a request for the graph data from a requestor, a set of arguments stored in the argument key-value store, wherein the arguments are linked to the predicates via the predicate key-value store and the links stored therein, wherein the request is used to derive the arguments, and
wherein the request is also represented as a triple prior to submitting the request to the predicate key-value store; and
returning the graph data to the requestor and displaying the graph data to the requestor.

2. The method of claim 1, wherein values in the predicate key-value store are represented by a pair of links to argument key-value stores.

3. The method of claim 1, wherein the at least one key-value store is at least one B-tree.

4. The method of claim 1, wherein at least one of the key-value stores is representable by at least one table.

5. The method of claim 1, wherein the Subjects are stored in the key-value stores as keys, and the Objects are stored as values.

6. The method of claim 1, wherein the Objects are stored in the key-values stores as keys, and the Subjects are stored as values.

7. The method of claim 1, wherein at least some arguments are stored in key stores, and wherein the key-value stores store links to the key stores.

8. The method of claim 1, wherein the data in the key-values stores are sorted by keys.

9. A system for storing graph data, the system comprising:
a processor;
a memory connected to the processor;
a computer program logic stored in the memory and executed on the processor for implementing the steps of claim 1.

10. The method of claim 1, wherein the processes are business processes represented by a workflow, such that contents of the workflow is stored as the graphs.

11. A computer-implemented method for storing and displaying application data, the method comprising:
generating graphs that represent the application data, the graphs having a plurality of nodes that correspond to arguments of triples and connecting edges that represent predicates of the triples, wherein the triples describe business entities and processes operating with the business entities using subjects-predicates-objects, and represent the predicates and the arguments associated with the predicates, and
wherein the predicates express relationships or connections between the arguments, which are the subjects and the objects of the triples, with the subjects representing an identifier of the business entities, and the objects are values of properties of the business entities;
storing the predicates in a predicate key-value store;
storing arguments in argument key-value stores;
storing assigned unique identifiers to statements to the argument key-value stores;
storing links to the argument key-value stores in the predicate key-value store for corresponding predicates stored in the predicate key-value store;
determining, in response to a request for the graph data from a requestor, a set of arguments stored in the argument key-value store, wherein the arguments are linked to the predicates via the predicate key-value store and the links stored therein, wherein the request is used to derive the arguments, and
wherein the request is also represented as a triple prior to submitting the request to the predicate key-value store; and
returning the graph data for display to the requestor.

12. The method of claim 11, wherein the at least one key-value store is at least one B-tree.

13. The method of claim 11, wherein at least one of the key-value stores is representable by at least one table.

14. The method of claim 11, wherein the statements are any of:
triples;
triplets;
quadruples;
quintuples;
and n-tuples.

15. The method of claim 11, further comprising storing at least one terminator in at least one argument key-value store.

16. The method of claim 11, wherein the unique identifiers are stored in separate key stores, and wherein the key-value stores store links to the key stores.

17. The method of claim 11, wherein the data in the key stores and the key-values stores are sorted by keys.

18. The method of claim 11, wherein a search for predicates in the predicate key-value store includes identifying intersections of arguments based on the unique identifiers.

* * * * *